(12) United States Patent
Marando et al.

(10) Patent No.: US 7,322,106 B2
(45) Date of Patent: Jan. 29, 2008

(54) METHOD OF MANUFACTURING A NODE FOR CONNECTING VEHICLE FRAME MEMBERS

(75) Inventors: Richard A. Marando, Mohrsville, PA (US); Scott M. McGill, Kenilworth, PA (US); Jason A. Poirier, Ballston Spa, NY (US); Andrew R. Simboli, Tucson, AZ (US)

(73) Assignee: Dana Corporation, Toledo, OH (US)

( * ) Notice: Subject to any disclaimer, the term of this patent is extended or adjusted under 35 U.S.C. 154(b) by 338 days.

(21) Appl. No.: 10/758,946

(22) Filed: Jan. 16, 2004

(65) Prior Publication Data

US 2005/0050730 A1   Mar. 10, 2005

Related U.S. Application Data

(60) Provisional application No. 60/440,573, filed on Jan. 16, 2003.

(51) Int. Cl.
*B21D 53/88*   (2006.01)
*B21D 39/00*   (2006.01)
*B62D 27/00*   (2006.01)

(52) U.S. Cl. .................. 29/897.2; 29/897; 29/507; 296/29; 296/203.01

(58) Field of Classification Search ............ 29/897.2, 29/897, 507; 296/29, 30, 203.01, 204, 203.02, 296/203.03, 203.04, 187.01; 403/294, 298, 403/335, 337

See application file for complete search history.

(56) References Cited

U.S. PATENT DOCUMENTS 630,054 A   8/1899   Heymann (Continued)

FOREIGN PATENT DOCUMENTS

DE   82873   9/1895

(Continued)

OTHER PUBLICATIONS

Online Definition for Aperture (Compact Oxford English Dictionary -www.askoxford.com/concise_oed/aperture?view=uk).*

*Primary Examiner*—David P. Bryant
*Assistant Examiner*—Sarang Afzali
(74) *Attorney, Agent, or Firm*—MacMillan, Sobanski & Todd, LLC

(57) ABSTRACT

A method of manufacturing a node for joining a plurality of structural members together, such as in a vehicular body and frame assembly, is well suited for joining structural members that are formed from differing materials. An insert is provided having a node securing portion and a mounting portion that is adapted to have a structural member secured thereto. A node is formed about the node securing portion of the insert for joining a plurality of structural members together. The insert can be formed from a first material, while the node can be formed from a second material that is different from the first material. The insert can be provided with a node securing portion having at least one aperture or protrusion formed therein, and the node can be formed within or about the aperture or protrusion. A plurality of inserts can be provided, each having a node securing portion and a mounting portion, and the node can be formed about each of the node securing portions of the inserts. The structural members can be secured to the mounting portions of the inserts before the node is formed.

20 Claims, 16 Drawing Sheets

| U.S. PATENT DOCUMENTS | | | | FOREIGN PATENT DOCUMENTS | | |
|---|---|---|---|---|---|---|
| 681,195 A | 8/1901 | Clark | | DE | 101705 | 2/1899 |
| 682,901 A | 9/1901 | Barber | | DE | 4423642 | 10/1995 |
| 1,591,215 A | 7/1926 | Jacobs | | DE | 199 29 057 | 12/2000 |
| D149,830 S | 6/1948 | Nelson | | DE | 101 12 313 | 9/2001 |
| 2,647,000 A | 7/1953 | Colley | | EP | 836983 | 4/1998 |
| 2,950,015 A | 8/1960 | Pataky | | EP | 1160465 | 12/2001 |
| 3,844,024 A | 10/1974 | Otto | | FR | 882471 | 6/1943 |
| 4,145,068 A | 3/1979 | Toyomasu et al. | | FR | 2302802 | 10/1976 |
| 4,541,649 A | 9/1985 | Grünfeld | | FR | 2726055 | 9/1995 |
| 4,618,163 A | 10/1986 | Hasler et al. | | GB | 19907 | 9/1897 |
| 4,660,345 A | 4/1987 | Browning | | GB | 24331 | 9/1911 |
| 4,735,355 A | 4/1988 | Browning | | GB | 454311 | 6/1935 |
| 5,226,469 A | 7/1993 | Matsumura et al. | | GB | 651105 | 3/1951 |
| 5,269,585 A * | 12/1993 | Klages et al. | 296/205 | GB | 696146 | 8/1953 |
| 5,381,849 A | 1/1995 | Fussnegger et al. | | GB | 2084684 | 4/1982 |
| 5,770,268 A | 6/1998 | Kuo et al. | | GB | 2386589 | 9/2003 |
| 5,782,401 A | 7/1998 | Hinrichs | | JP | 38-11504 | 7/1963 |
| 5,865,362 A | 2/1999 | Behrmann et al. | | JP | 52015958 | 2/1977 |
| 6,126,509 A | 10/2000 | Berman | | JP | 55-2148 | 1/1980 |
| 6,216,509 B1 | 4/2001 | Lotspaih et al. | | JP | 1-212679 | 8/1989 |
| 6,216,763 B1 | 4/2001 | Ruehl et al. | | JP | 1-172992 | 12/1989 |
| 6,241,267 B1 | 6/2001 | Dziadosz et al. | | WO | 99/32341 | 7/1999 |
| 6,241,310 B1 | 6/2001 | Patelczyk | | WO | 02/04276 | 1/2002 |
| 6,299,210 B1 | 10/2001 | Ruehl et al. | | | | |
| 6,672,627 B1 * | 1/2004 | Mariman et al. | 285/124.1 | * cited by examiner | | |

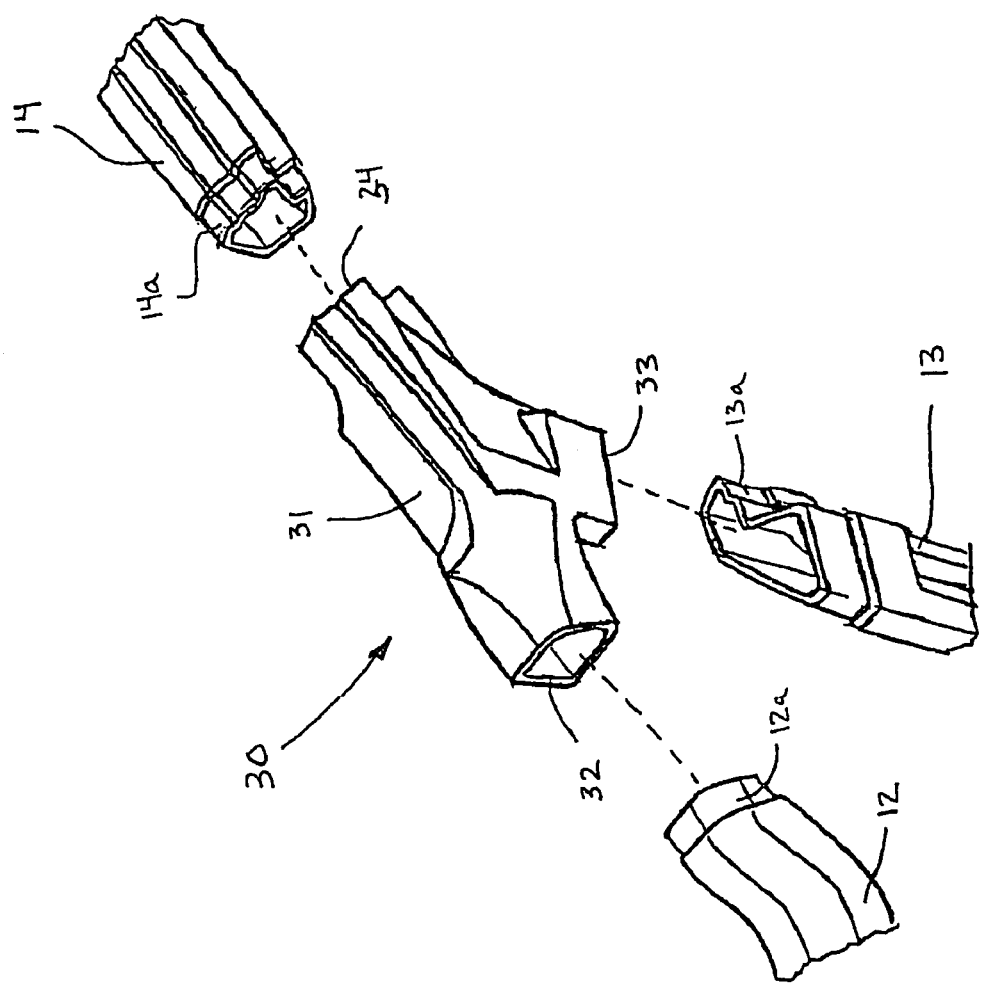

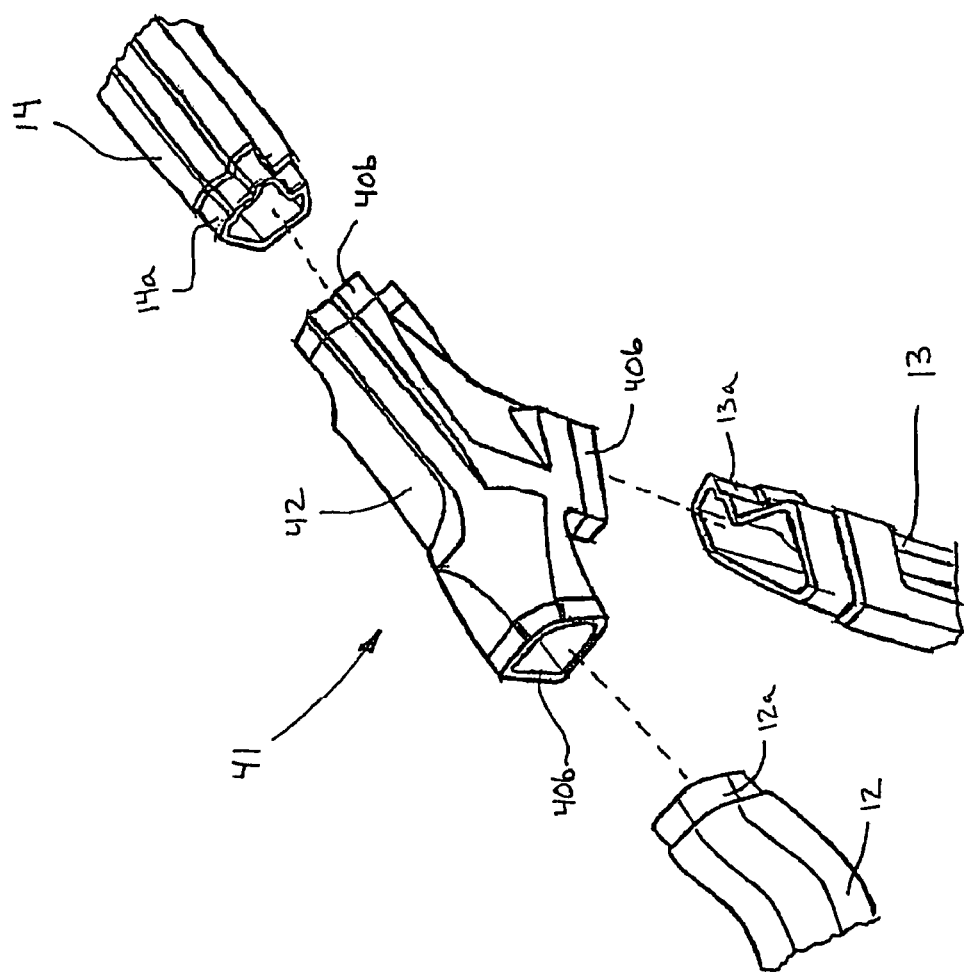

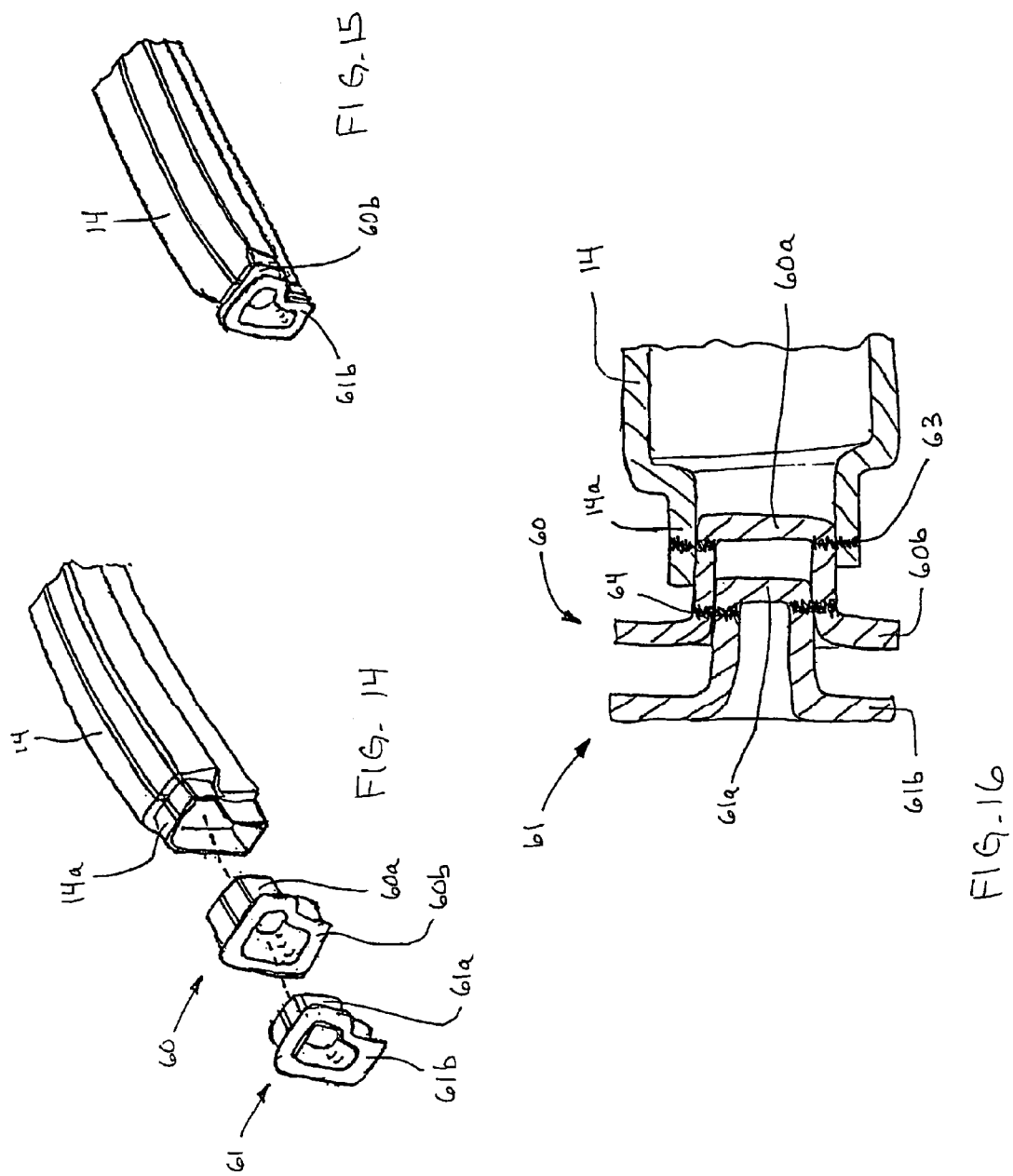

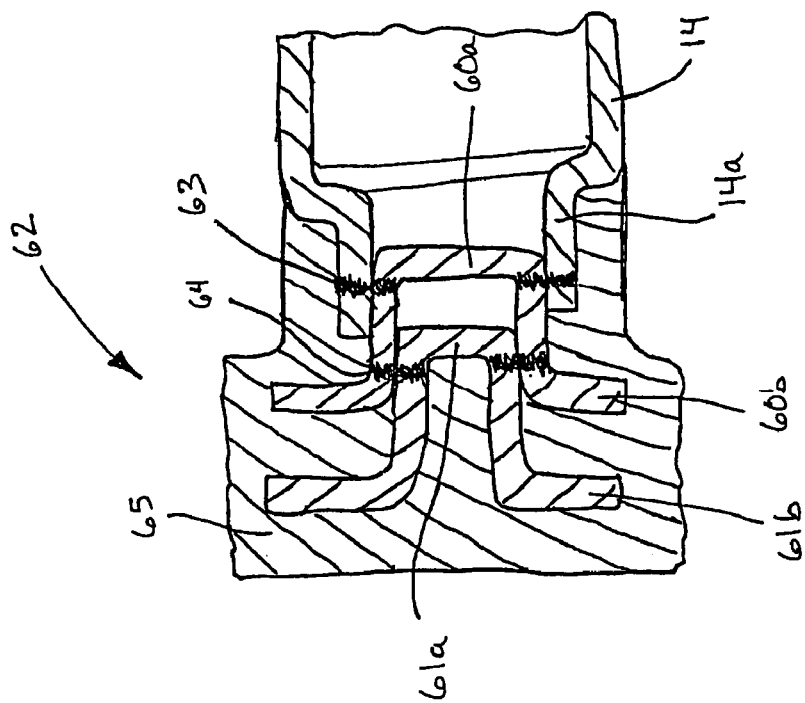
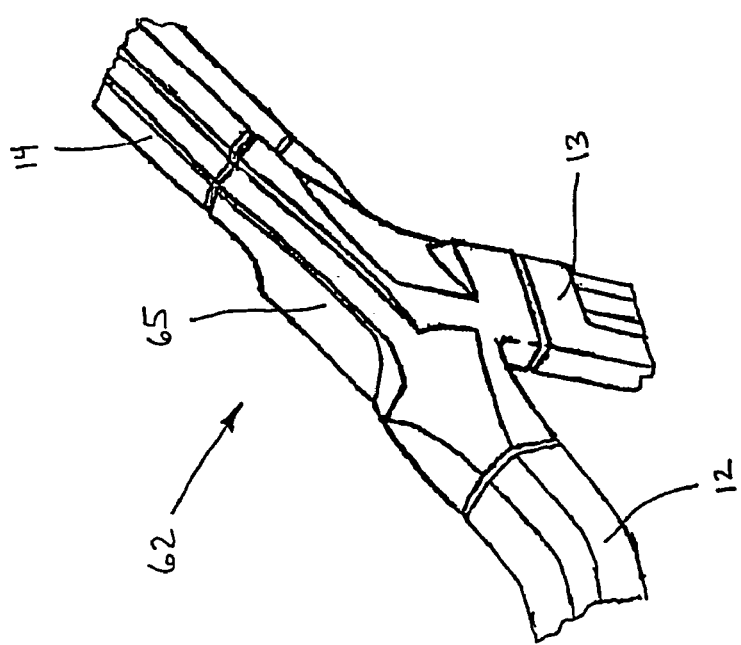

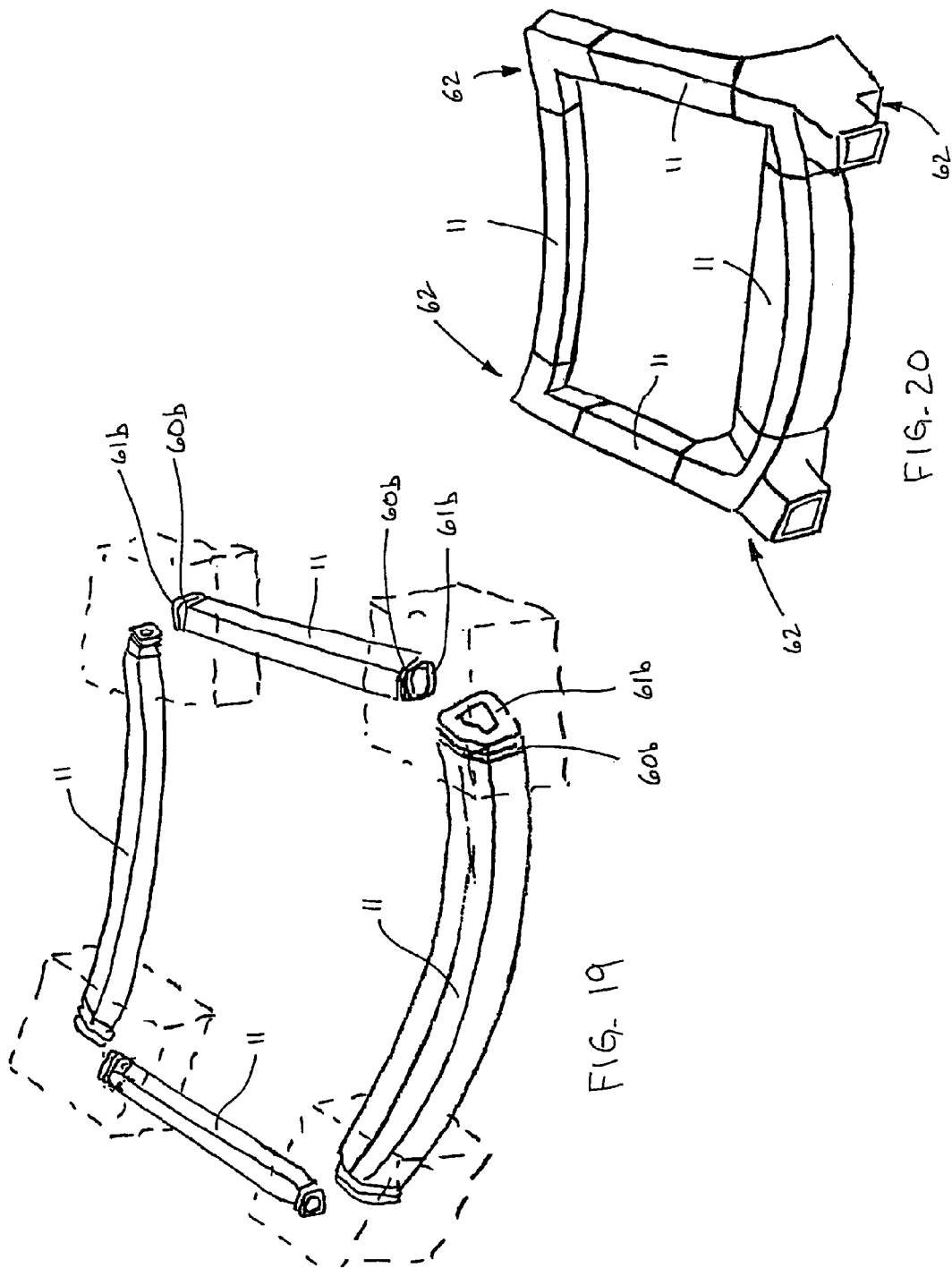

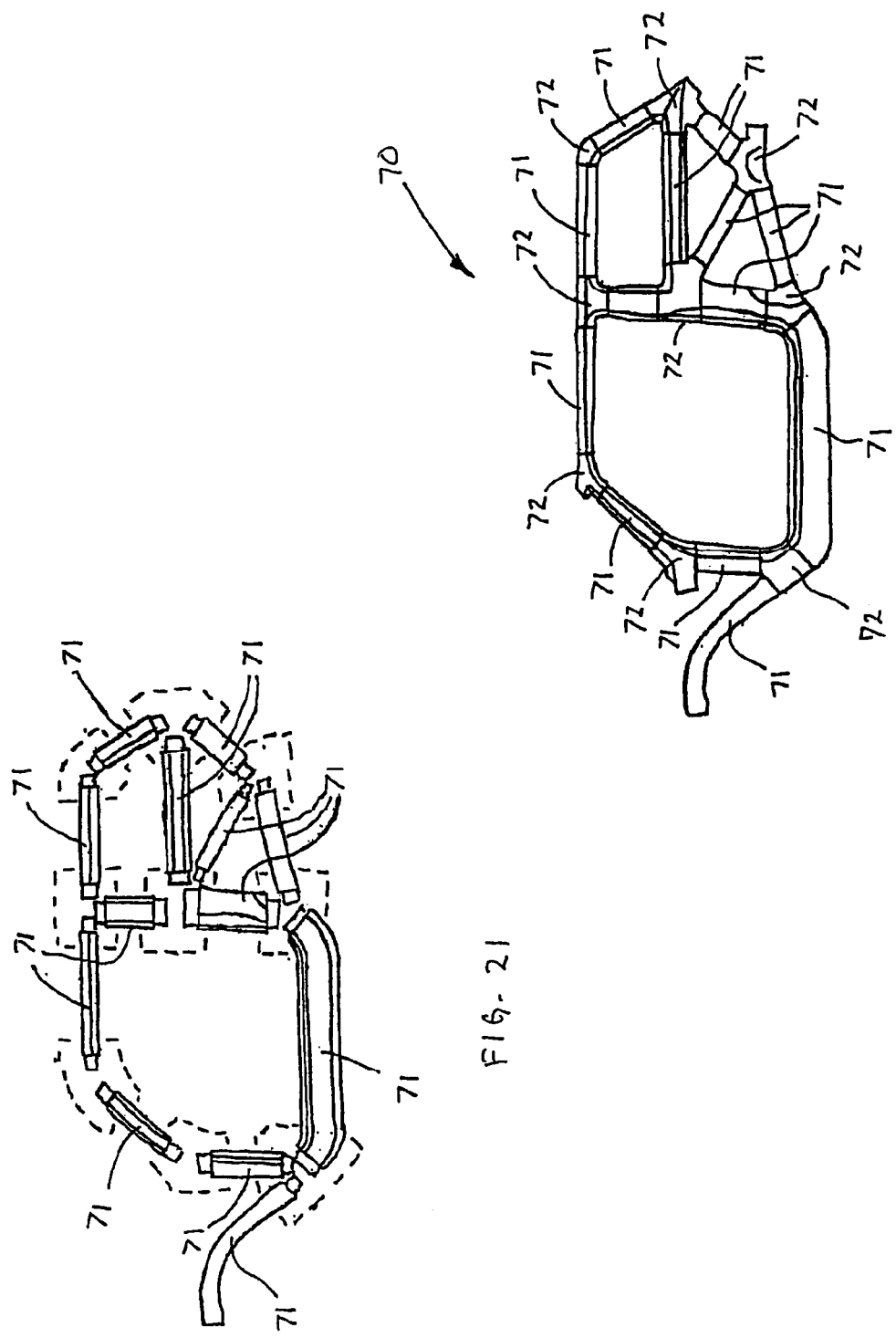

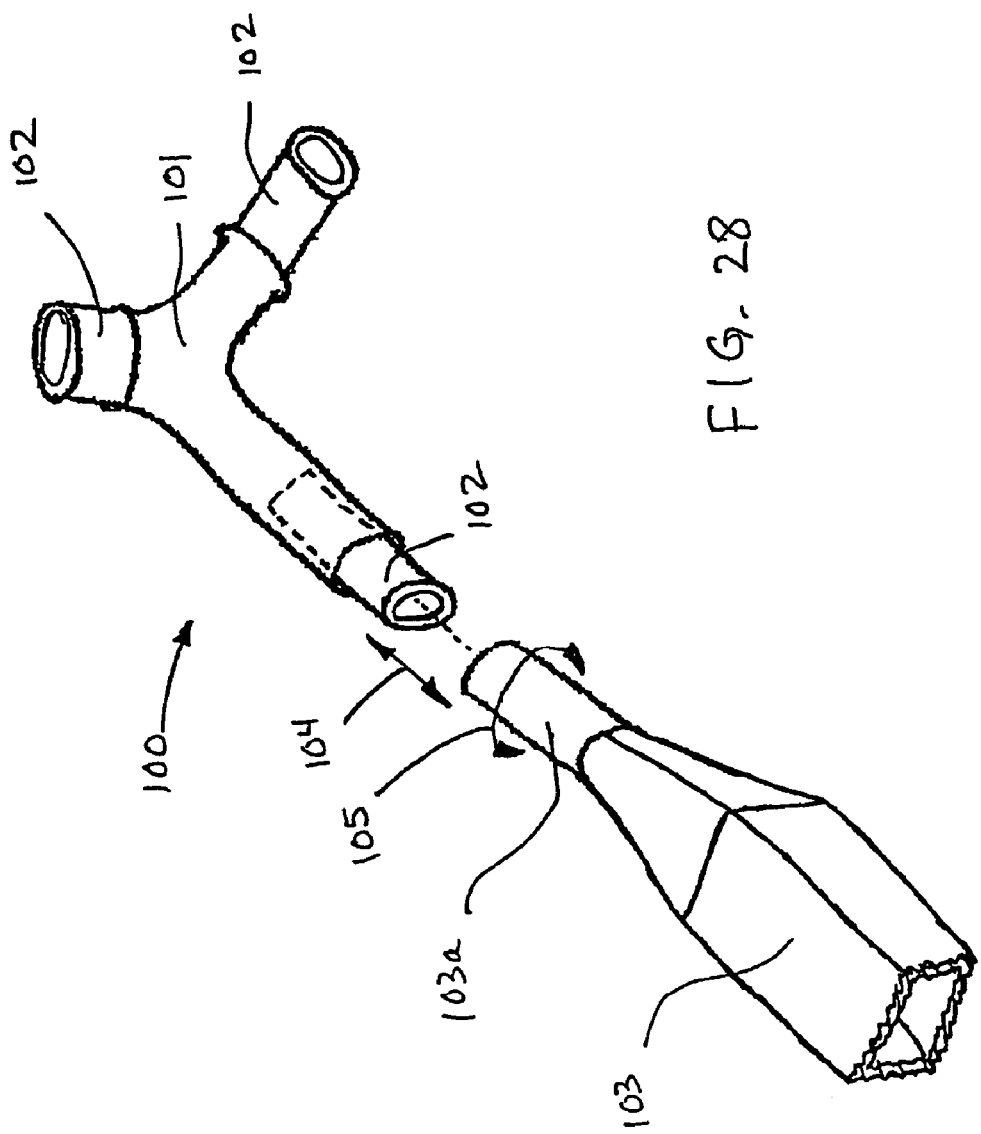

METHOD OF MANUFACTURING A NODE FOR CONNECTING VEHICLE FRAME MEMBERS

CROSS REFERENCE TO RELATED APPLICATION

This application claims the benefit of U.S. Provisional Application No. 60/440,573, filed Jan. 16, 2003, the disclosure of which is incorporated herein by reference.

BACKGROUND OF THE INVENTION

This invention relates in general to the manufacture and assembly of vehicle frame members and in particular to a method and apparatus for forming nodes that facilitate the connection of frame members.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, sometimes referred to as a space frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

Most known vehicular body and frame assemblies are formed from a plurality of individual structural members that are permanently joined to one another. In the past, the various structural members have been secured directly to one another to form the vehicular body and frame assembly. More recently, it has been proposed to manufacture a vehicular body and frame assembly by providing a plurality of structural members and a plurality of nodes. The ends of the structural members are secured to mounting portions provided on the nodes to form the vehicular body and frame assembly. The known methods for manufacturing a vehicular body and frame assembly have been satisfactory when all of the structural members thereof are formed from the same material. However, it has been found to be desirable to form some or all of the structural members of the vehicular body and frame assembly from different materials. Thus, it would be desirable to provide an improved method of manufacturing a node for joining a plurality of structural members together, such as in a vehicular body and frame assembly, that is well suited for joining structural members that are formed from differing materials.

SUMMARY OF THE INVENTION

This invention relates to an improved method of manufacturing a node for joining a plurality of structural members together, such as in a vehicular body and frame assembly, is well suited for joining structural members that are formed from differing materials. An insert is provided having a node securing portion and a mounting portion that is adapted to have a structural member secured thereto. A node is formed about the node securing portion of the insert for joining a plurality of structural members together. The insert can be formed from a first material, while the node can be formed from a second material that is different from the first material. The insert can be provided with a node securing portion having at least one aperture or protrusion formed therein, and the node can be formed within or about the aperture or protrusion. A plurality of inserts can be provided, each having a node securing portion and a mounting portion, and the node can be formed about each of the node securing portions of the inserts. The structural members can be secured to the mounting portions of the inserts before the node is formed.

Various objects and advantages of this invention will become apparent to those skilled in the art from the following detailed description of the preferred embodiments, when read in light of the accompanying drawings.

BRIEF DESCRIPTION OF THE DRAWINGS

FIG. 5 is an enlarged exploded perspective view of a node in accordance with a second embodiment of this invention and the end portions of several of the structural members illustrated in FIG. 1.

FIG. 9 is an enlarged exploded perspective view of a third embodiment of a node after it has been formed about the inserts illustrated in FIG. 8, and further including the end portions of several of the structural members illustrated in FIG. 1.

FIG. 14 is an exploded perspective view of an end portion of one of the structural members illustrated in FIG. 1 and a pair of insert cups that can be used to form a fifth embodiment of a node for joining two or more of the structural members illustrated in FIG. 1 together.

FIG. 15 is a perspective view of the end portion of the structural member and the pair of insert cups illustrated in FIG. 14 shown assembled.

FIG. 16 is a sectional elevational view of the end portion of the structural member and the pair of insert cups illustrated in FIG. 15.

FIG. 17 is a perspective view of a fifth embodiment of the node after it has been formed about the end portion of the structural member and the pair of insert cups illustrated in FIGS. 14, 15, and 16, and further about the end portions of several others of the structural members illustrated in FIG. 1.

FIG. 18 is a sectional elevational view of a portion of the fifth embodiment of the node illustrated in FIG. 17 and the end portion of the structural member illustrated in FIG. 16.

FIG. 19 is an exploded perspective view of a plurality of the structural members illustrated in FIG. 1 prior to being joined together by a plurality of nodes to form a vehicle frame sub-assembly.

FIG. 20 is a perspective view of the vehicle sub-frame assembly illustrated in FIG. 19 shown assembled.

FIG. 21 is an exploded side elevational view of a plurality of the structural members prior to being joined together by a plurality of nodes to form a vehicle side frame assembly.

FIG. 22 is a side elevational view of the vehicle side frame assembly illustrated in FIG. 21 shown assembled.

FIG. 28 is a perspective view of a ninth embodiment of a node, a plurality of inserts, and an end portion of a structural member.

DETAILED DESCRIPTION OF THE PREFERRED EMBODIMENTS

Figure 1:
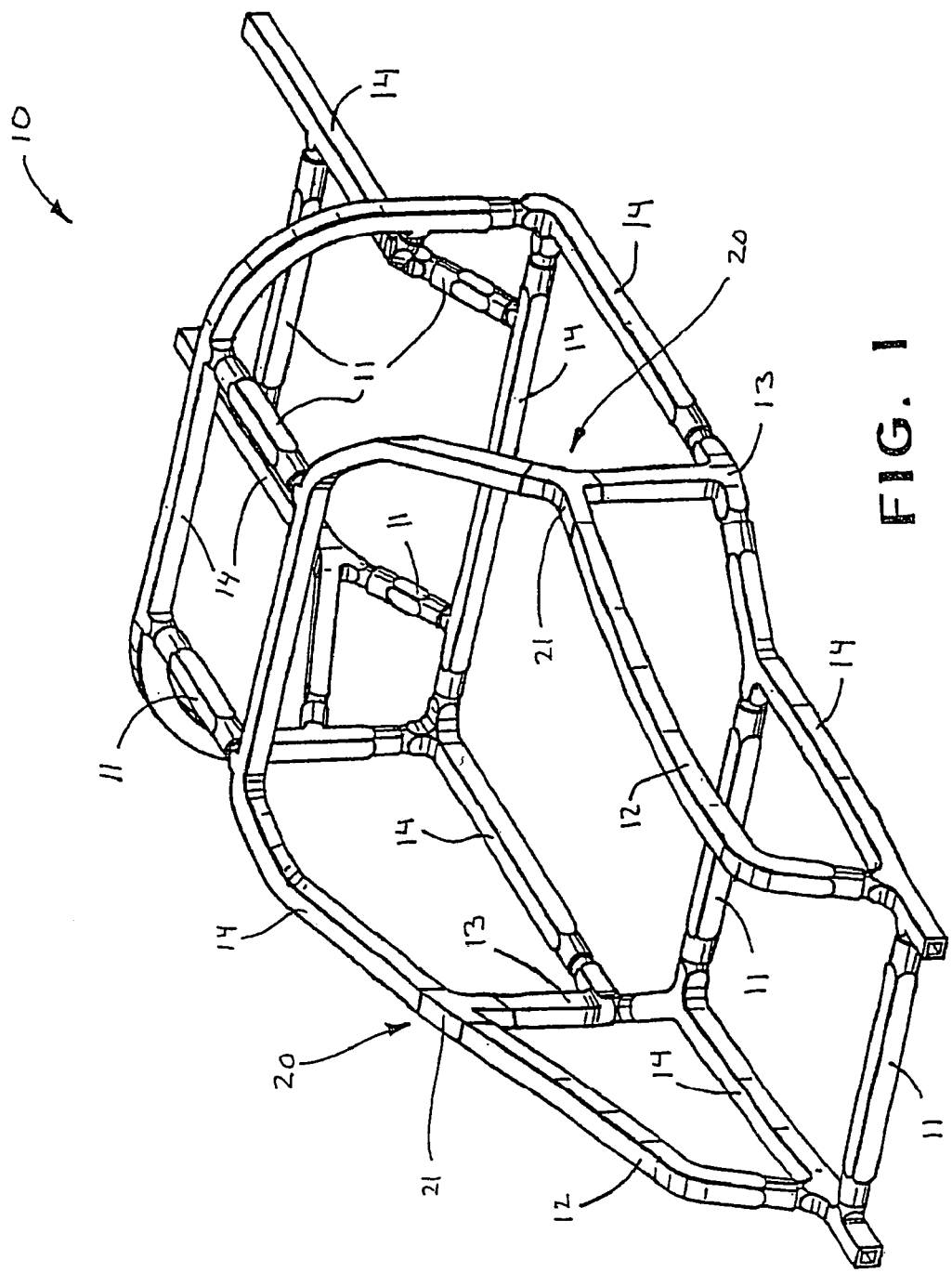
FIG. 1 is a perspective view of a vehicle frame assembly that is formed from a plurality of structural members and includes a pair of nodes in accordance with a first embodiment of this invention for joining two or more of such structural members together.

Referring now to the drawings, there is illustrated in FIG. 1 a vehicular body and frame assembly, indicated generally at 10, in accordance with this invention. The illustrated vehicular body and frame assembly 10 is, in large measure, conventional in the art and is intended merely to illustrate one environment in which this invention may be used. Thus, the scope of this invention is not intended to be limited for use with the specific structure for the vehicular body and frame assembly 10 illustrated in FIG. 1 or with vehicular body and frame assemblies in general. On the contrary, as will become apparent below, this invention may be used in any desired environment for the purposes described below.

The illustrated vehicular body and frame assembly 10 is a unitized space frame assembly that includes four different types of structural members that are secured to one another. The first type of structural member is a straight member, such as shown at 11. Straight members 11 are generally linear and elongated in shape. The second type of structural member is a curved member, such as shown at 12. Curved members 12 are non-linear and elongated in shape. The third type of structural member is a joint node, such as shown at 13. Joint nodes 13 are relatively short members that are provided to join adjacent structural members of the vehicle frame assembly 10 together at a joint. The fourth type of structural member is a member node, such as shown at 14. Member nodes 14 are relatively long structural members that are also provided to join adjacent members of the vehicle frame assembly 10 at a joint.

In the illustrated embodiment, each of the structural members 11, 12, 13, and 14 is formed of metallic material, although such is not required. Preferably, such structural members 11, 12, 13, and 14 are all hollow and cylindrical in shape, although such is not required. The structural members 11, 12, 13, and 14 can be hydroformed to desired shapes, although again such is not required. The structural members 11, 12, 13, and 14 are, for the most part, joined directly to one another to produce the vehicle frame assembly 10. This can be accomplished, for example, by forming some end portions of the various structural members 11, 12, 13, and 14 to be relatively small in dimension and by forming other end portions of the various structural members 11, 12, 13, and 14 to be relatively large in dimension. Thus, the relatively smaller end portions can be disposed telescopically within the relatively larger end portions and secured directly together, such as by welding.

The illustrated vehicle frame assembly 10 also includes two nodes in accordance with a first embodiment of this invention, each indicated generally at 20. Each of the nodes 20 is provided for joining two or more of the structural members 11, 12, 13, and 14 together. In the illustrated embodiment, each of the nodes 20 is provided for securing one of the curved members 12, one of the joint nodes 13, and one of the member nodes 14 together at a joint. However, it will be appreciated that the nodes 20 can be used to join any number of any of the structural members 11, 12, 13, and 14 of the vehicle frame assembly 10 together at a variety of different joints.

Figure 2:
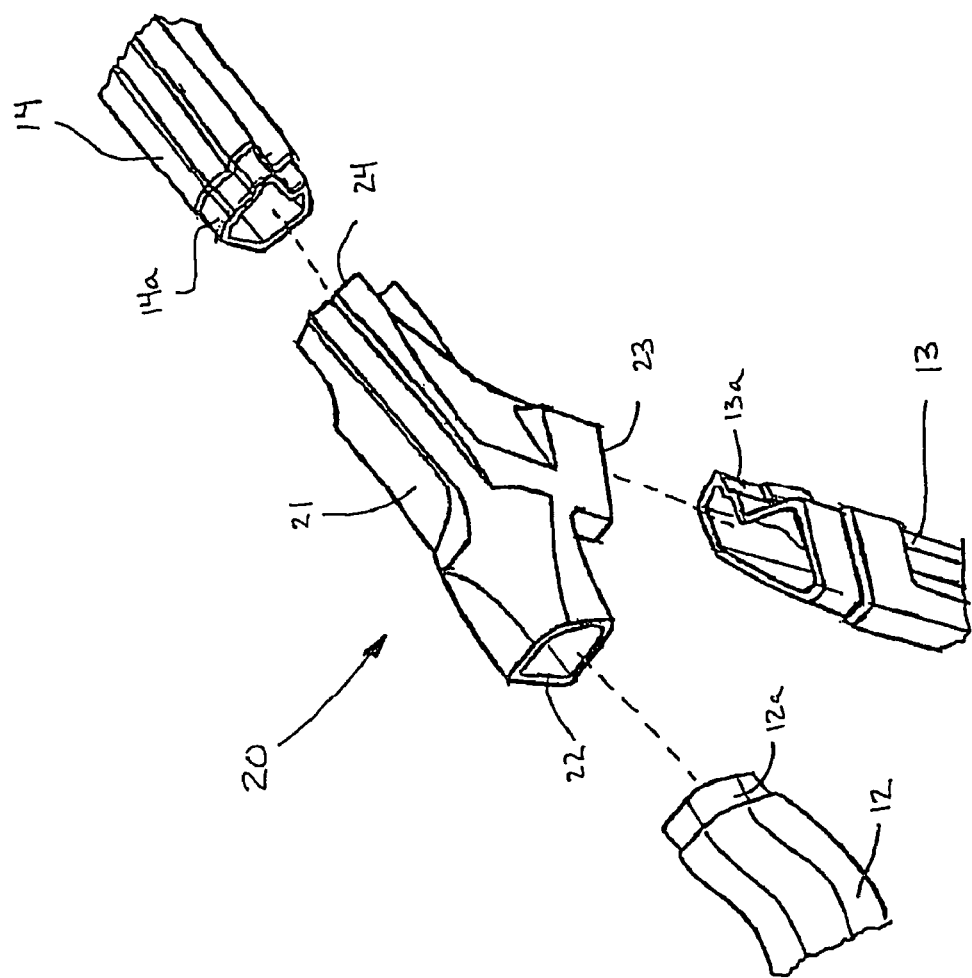
FIG. 2 is an enlarged exploded perspective view of one of the nodes and the end portions of several of the structural members illustrated in FIG. 1.
Figure 4:
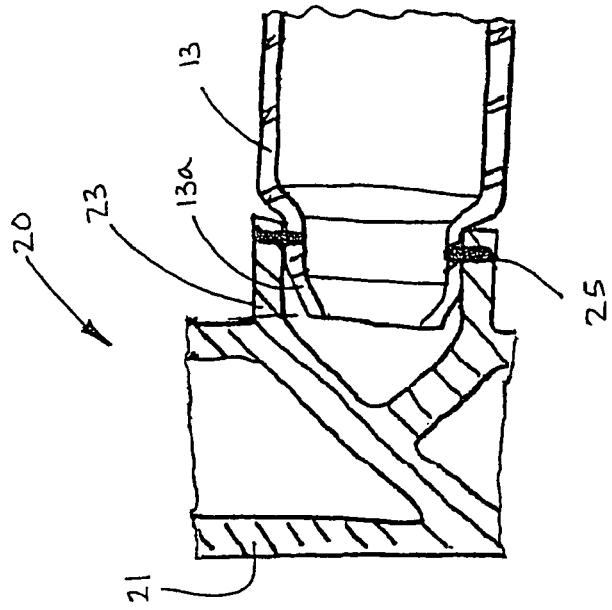
FIG. 4 is a sectional elevational view of a portion of the node and the end portion of one of the structural members illustrated in FIG. 3.
Figure 3:
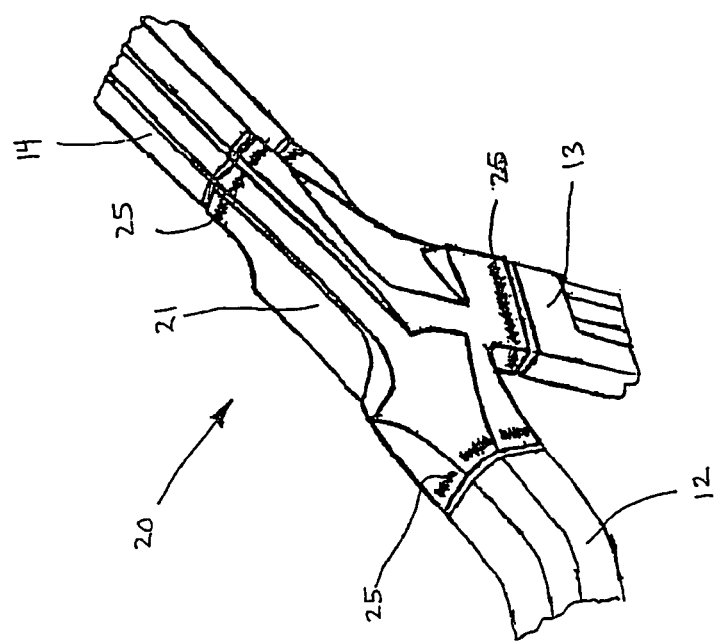
FIG. 3 is an enlarged perspective view of the node and the end portions of the structural members illustrated in FIG. 2 shown assembled.

The structure of one of the nodes 20 is illustrated in detail in FIGS. 2, 3, and 4. As shown therein, the illustrated node 20 includes a body portion 21 having a plurality of mounting portions 22, 23, and 24 extending outwardly therefrom. The node 20 can be manufactured in any desired manner, such as by casting. As best shown in FIGS. 2 and 4, the mounting portions 22, 23, and 24 are hollow and are formed having cross sectional shapes that are complementary to the shapes of end portions 12a, 13a, and 14a of the structural members 12, 13, and 14 that are intended to be respectively secured thereto. Thus, the end portions 12a, 13a, and 14a of the structural members 12, 13, and 14, respectively, can be inserted telescopically within the mounting portions 22, 23, and 24 of the node 20, as shown in FIGS. 3 and 4. Preferably, the outer surfaces of the end portions 12a, 13a, and 14a fit snugly within the inner surfaces of the associated mounting portions 22, 23, and 24. Additionally, the end portions 12a, 13a, and 14a may be formed having tapered outer ends, as shown in FIG. 4, to facilitate the insertion thereof within the associated mounting portion 22, 23, and 24 of the node 20. Preferably, the end portions 12a, 13a, and 14a of the structural members 12, 13, and 14 are hydroformed, such that the dimensions of the end portions 12a, 13a, and 14a are precisely controlled to facilitate securing the end portions 12a, 13a, and 14a to the associated mounting portions 22, 23, and 24, respectively. The illustrated end portions 12a, 13a, and 14a of the structural members 12, 13, and 14 are secured to the associated mounting portions 22, 23, and 24 by welds, such as shown at 25 in FIGS. 3 and 4. The welds 25 may be created by any desired process, such as by laser welding or magnetic pulse welding. The use of conventional welding techniques to secure the structural members 12, 13, and 14 to the associated mounting portions 22, 23, and 24 is facilitated when the structural members 12, 13, and 14 and the node 20 are all formed from the same metallic material.

Figure 7:
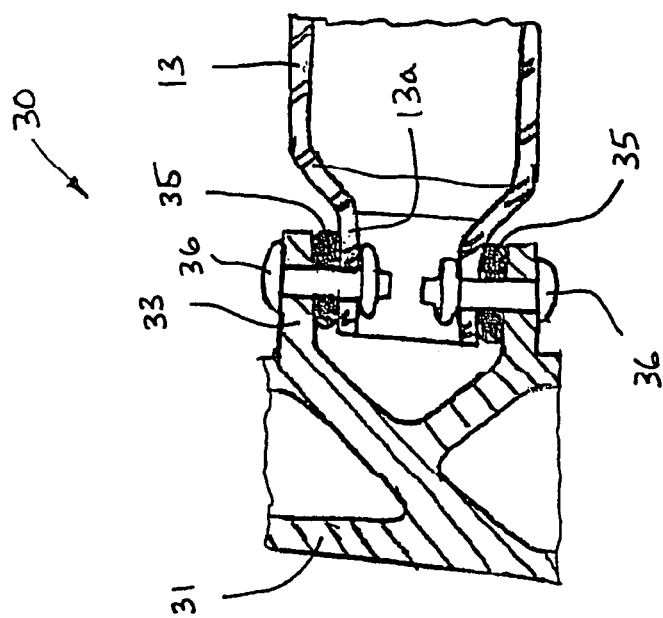
FIG. 7 is a sectional elevational view of a portion of the node and the end portion of one of the structural members illustrated in FIG. 6.
Figure 6:
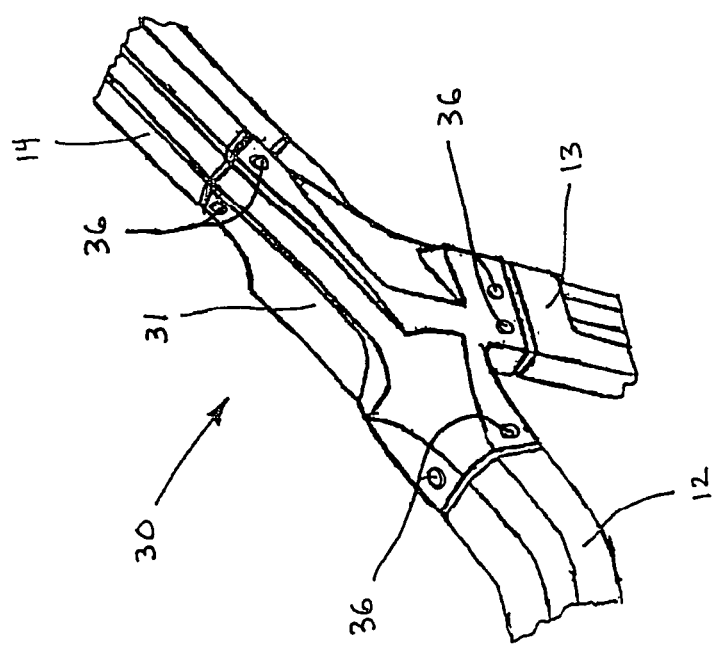
FIG. 6 is an enlarged perspective view of the node and the end portions of the structural members illustrated in FIG. 5 shown assembled.

However, in some instances, it may be desirable to secure the structural members 12, 13, and 14 to the associated mounting portions 22, 23, and 24 without the use of welding, such as when some or all of the structural members 12, 13, and 14 and the node 20 are formed from different metallic or non-metallic materials. In these instances, a second embodiment of one of the nodes, indicated generally at 30 in FIGS. 5, 6, and 7, can be used. As shown therein, the illustrated node 30 includes a body portion 31 having a plurality of mounting portions 32, 33, and 34 extending outwardly therefrom. The node 30 can be manufactured in any desired manner, such as by casting. As best shown in FIGS. 5 and 7, the mounting portions 32, 33, and 34 are hollow and are formed having cross sectional shapes that are complementary to the shapes of the end portions 12a, 13a, and 14a of the structural members 12, 13, and 14 that are intended to be respectively secured thereto. Thus, the end portions 12a, 13a, and 14a of the structural members 12, 13, and 14, respectively, can be inserted telescopically within the mounting portions 32, 33, and 34 of the node 30, as shown in FIGS. 6 and 7. Preferably, the outer surfaces of the end portions 12a, 13a, and 14a fit within the inner surfaces of the associated mounting portions 32, 33, and 34 with a predetermined amount of clearance therebetween. If desired, the end portions 12a, 13a, and 14a may also be formed having tapered outer ends (not shown) to facilitate the insertion thereof within the associated mounting portion 32, 33, and 34 of the node 30. Preferably, the end portions 12a, 13a, and 14a of the structural members 12, 13, and 14 are hydroformed, such that the dimensions of the end portions 12a, 13a, and 14a are precisely controlled to facilitate securing the end portions 12a, 13a, and 14a to the associated mounting portions 22, 23, and 24, respectively. The end portions 12a, 13a, and 14a of the structural members 12, 13, and 14 are secured to the associated mounting portions 32, 33, and 34 by adhesive, such as shown at 35 in FIG. 7, and/or by rivets 36 or similar fasteners, such as shown at 36 in FIGS. 6 and 7. Preferably, the end portions 12a, 13a, and 14a and node 30 may be formed such that when the end portions 12a, 13a, and 14a are inserted telescopically within the respective mounting portions 32, 33, and 34, a gap is provided therebetween. The gap allows the adhesive 35 to be positioned between the end portions 12a, 13a, and 14a and the respective mounting portions 32, 33, and 34.

Figure 8:
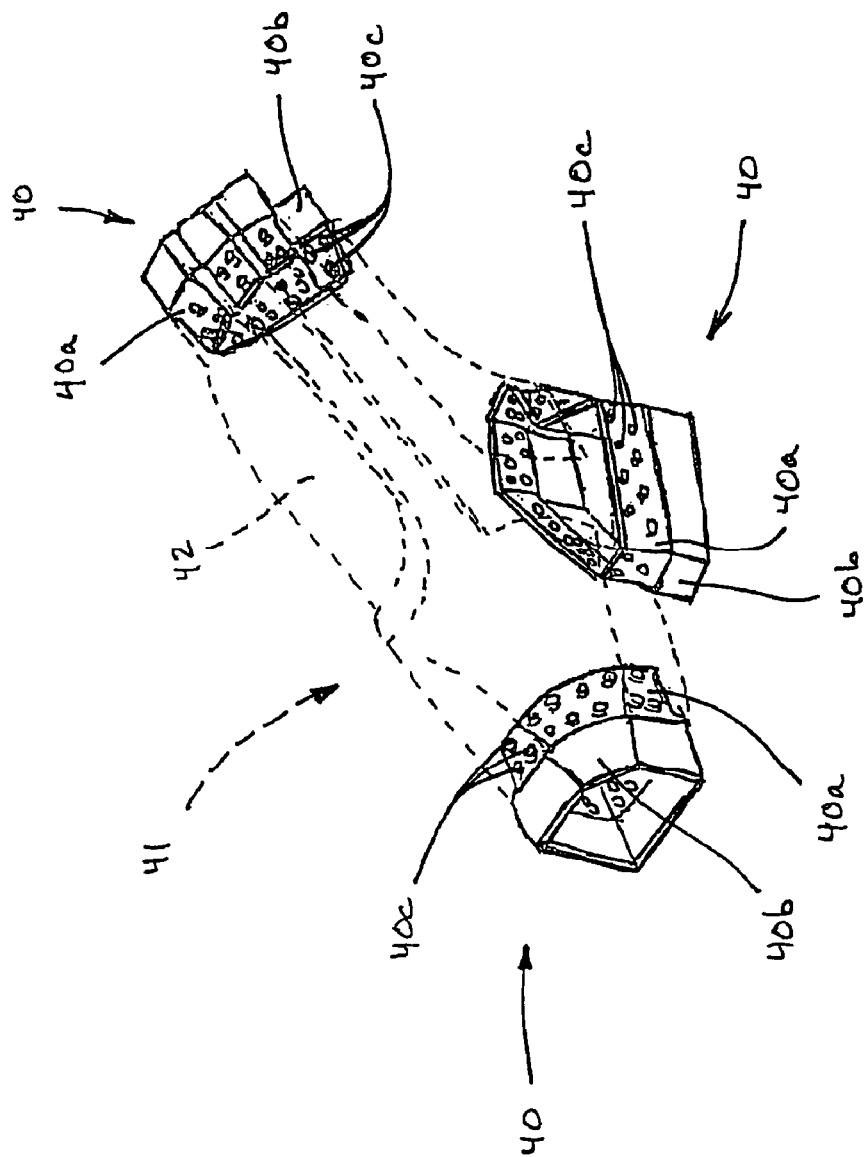
FIG. 8 is an enlarged perspective view of a plurality of inserts that can be used to form a third embodiment of a node for joining two or more of the structural members illustrated in FIG. 1 together.
Figure 11:
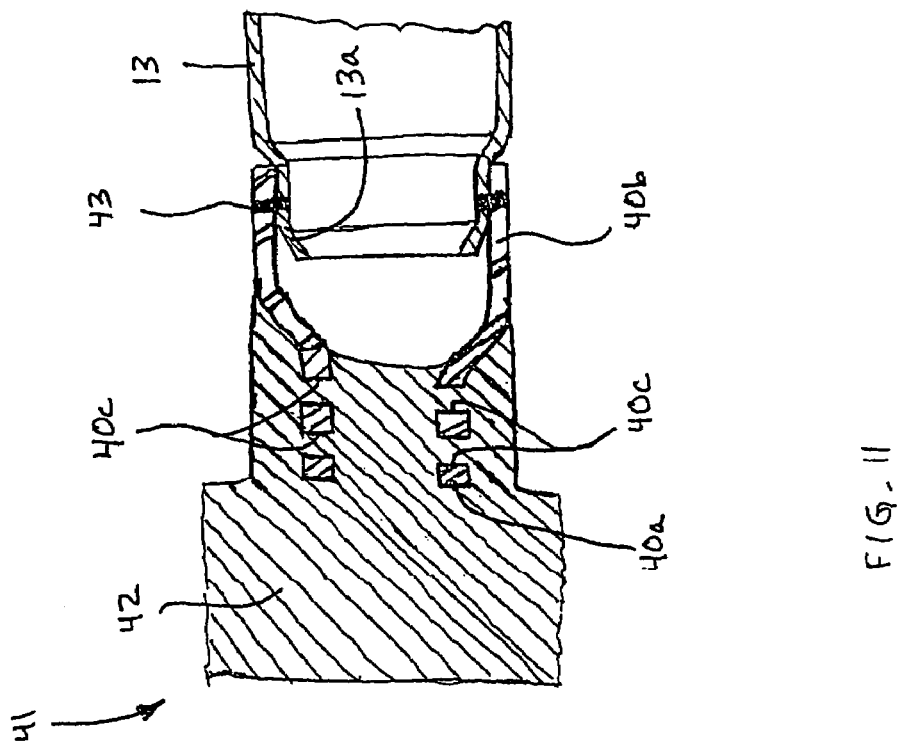
FIG. 11 is a sectional elevational view of a portion of the node and the end portion of one of the structural members illustrated in FIG. 10.
Figure 10:
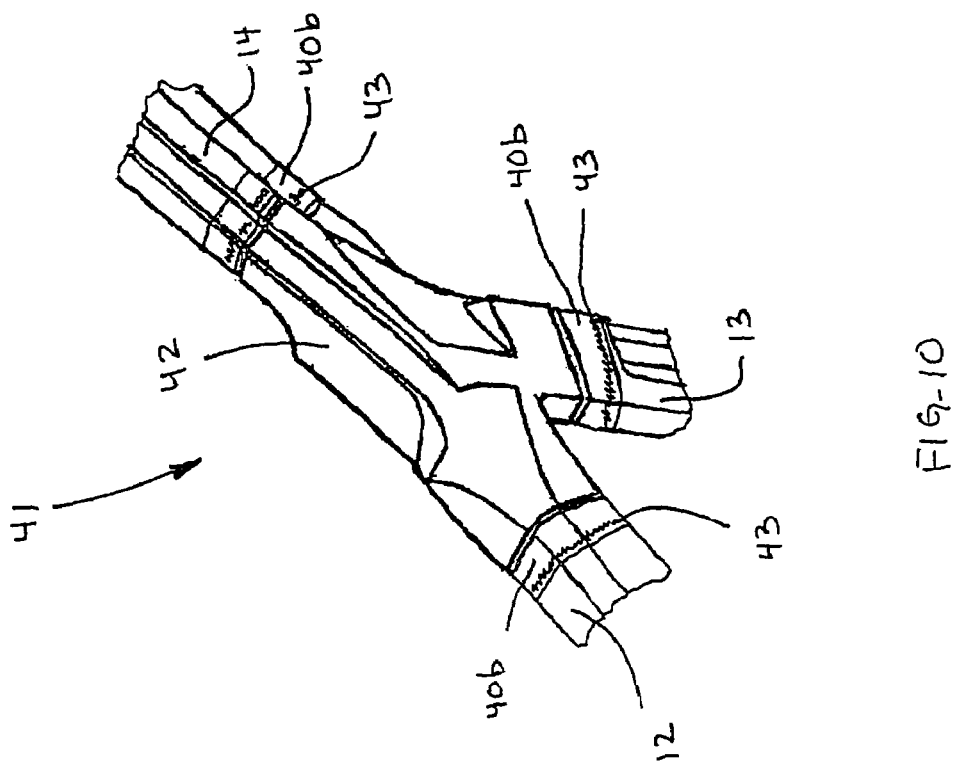
FIG. 10 is an enlarged perspective view of the node and the end portions of the structural members illustrated in FIG. 9 shown assembled.

FIG. 8 is an enlarged exploded perspective view of a plurality of inserts, indicated generally at 40, that can be used to form a third embodiment of a node, indicated generally at 41 in FIGS. 9, 10, and 11, for joining two or more of the structural members 11, 12, 13, and 14 illustrated in FIG. 1 together. Each of the illustrated inserts 40 includes a node securing portion 40a and a mounting portion 40b. Each of the node securing portions 40a has one or more apertures 40c formed therethrough. Preferably, the inserts 40 are roll-formed and swaged to a desired shape, although and desired method of manufacture can be used. To manufacture the node 41, the inserts 40 are initially positioned in desired positions relative to one another, such as shown in FIG. 8. Such relative positioning can, for example, be accomplished by providing a die (not shown), such as a conventional casting die, having cavities formed therein for respectively supporting the inserts 40 in the desired relative orientation. Then, the casting die is filled with a conventional casting material that extends about each of the node securing portions 40a of the inserts 40, including into the apertures 40c formed through such node securing portions 40a. Preferably, the casting material does not extend about the mounting portions 40b of the inserts 40. The casting material is subsequently hardened and removed from the casting die to provide the node 41 including a body portion 42 having each of the inserts 40 secured thereto, as shown in FIG. 9. The casting process is particularly well suited when the inserts 40 and the body portion 42 of the node 41 are formed from a different materials. For example, the inserts 40 may be formed from a steel alloy material, while the body portion 42 of the node 41 may be formed from an aluminum alloy material. By allowing the casting material to extend into the apertures 40c formed through the node securing portions 40a of the inserts 40, a secure mechanical connection is provided between the body portion 42 of the node 40 and the inserts 40, especially when differing materials are used.

Similar to the mounting portions 22, 23, and 24 discussed above, the mounting portions 40b are hollow and are formed having cross sectional shapes that are complementary to end portions 12a, 13a, and 14a of the structural members 12, 13, and 14 that are intended to be respectively secured thereto, such as shown in FIG. 9. Thus, the end portions 12a, 13a, and 14a of the structural members 12, 13, and 14, respectively, can be inserted telescopically within the mounting portions 40b of the node 41, as shown in FIGS. 10 and 11. Preferably, the outer surfaces of the end portions 12a, 13a, and 14a fit snugly within the inner surfaces of the associated mounting portions 40b. However, the end portions 12a, 13a, and 14a may be formed having tapered outer ends, as shown in FIG. 11, to facilitate the insertion thereof within the associated mounting portion 40b of the node 41. The end portions 12a, 13a, and 14a of the structural members 12, 13, and 14 can secured to the associated mounting portions 40b by welds, such as shown at 43 in FIGS. 10 and 11. The welds 43 may be created by any desired process, such as by laser welding or magnetic pulse welding. The use of conventional welding techniques to secure the structural members 12, 13, and 14 to the associated mounting portions 40b is facilitated when the structural members 12, 13, and 14 and the mounting portion 40b are all formed from the same metallic material.

Figures 12, 13:
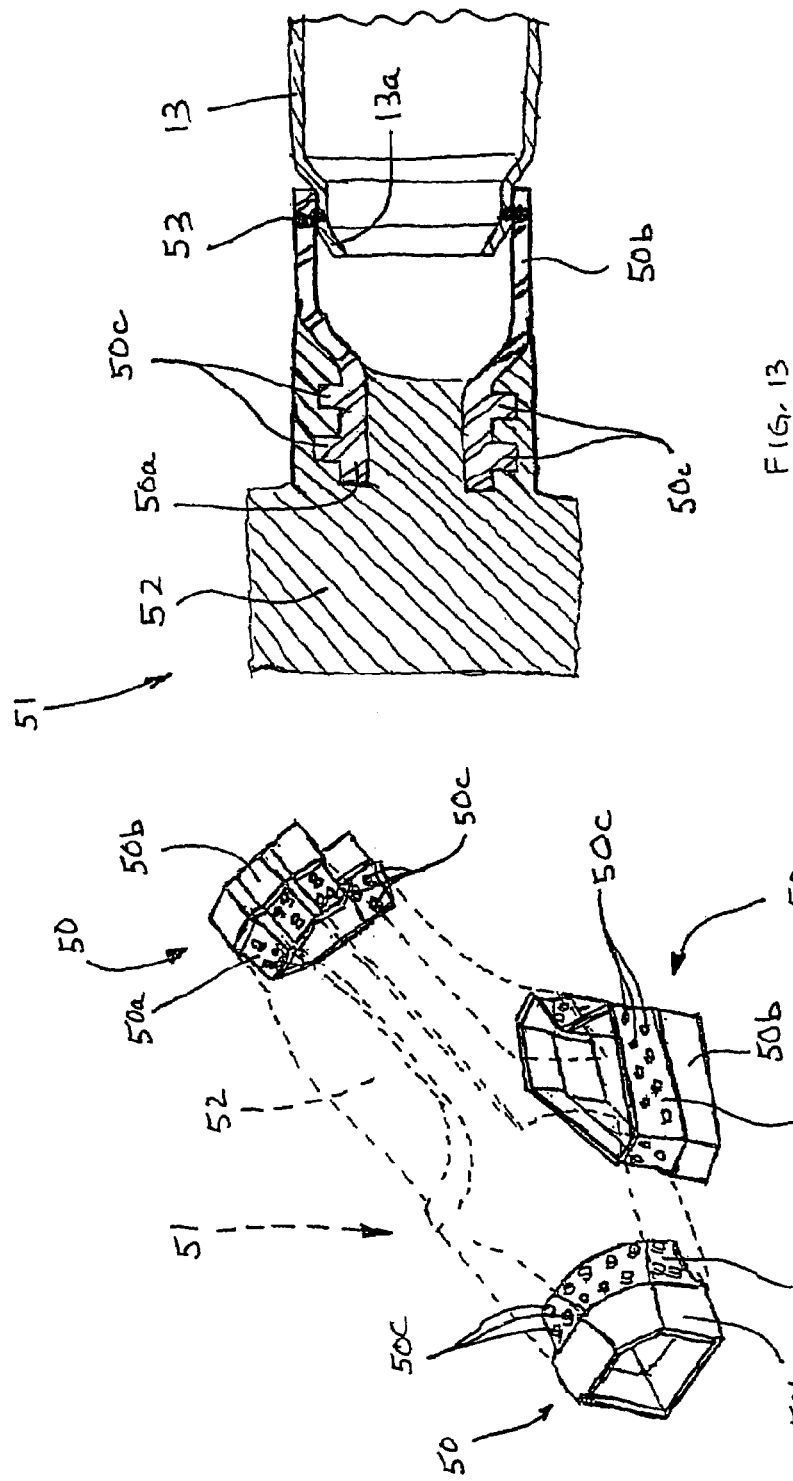
FIG. 12 is an enlarged perspective view of a plurality of inserts that can be used to form a fourth embodiment of a node for joining two or more of the structural members illustrated in FIG. 1 together.
FIG. 13 is a sectional elevational view of a portion of a fourth embodiment of a node and the end portion of one of the structural members illustrated in FIG. 1.

FIG. 12 is an enlarged exploded perspective view of a plurality of inserts, indicated generally at 50, that can be used to form a fourth embodiment of a node, indicated generally at 51 in FIG. 13, for joining two or more of the structural members 11, 12, 13, and 14 illustrated in FIG. 1 together. Each of the illustrated inserts 50 includes a node securing portion 50a and a mounting portion 50b. Each of the node securing portions 50a has one or more outwardly extending protrusions 50c formed thereon. To manufacture the node 51, the inserts 50 are initially positioned in desired positions relative to one another, such as shown in FIG. 12. Such relative positioning can, for example, be accomplished by providing a die (not shown), such as a conventional casting die, having cavities formed therein for respectively supporting the inserts 50 in the desired relative orientation. Then, the casting die is filled with a conventional casting material that extends about each of the node securing portions 50a of the inserts 50, including about the protrusions 50c formed on such node securing portions 50a. Preferably, the casting material does not extend about the mounting portions 50b of the inserts 50. The casting material is subsequently hardened and removed from the casting die to provide the node 51 including a body portion 52 having each of the inserts 50 secured thereto, as shown in FIG. 13. The casting process is particularly well suited when the inserts 50 and the body portion 52 of the node 51 are formed from a different materials. For example, the inserts 50 may be formed from a steel alloy material, while the body portion 52 of the node 51 may be formed from an aluminum alloy material. By allowing the casting material to extend about the protrusions 50c formed on the node securing portions 50a of the inserts 50, a secure mechanical connection is provided between the body portion 52 of the node 51 and the inserts 50, especially when differing materials are used.

Similar to the mounting portions 40b discussed above, the mounting portions 50b are hollow and are formed having cross sectional shapes that are complementary to end portions 12a, 13a, and 14a of the structural members 12, 13, and 14 that are intended to be respectively secured thereto, such as shown in FIG. 13. Thus, the end portions 12a, 13a, and 14a of the structural members 12, 13, and 14, respectively, can be inserted telescopically within the mounting portions 50b of the node 51, as shown in FIG. 13. Preferably, the outer surfaces of the end portions 12a, 13a, and 14a fit snugly within the inner surfaces of the associated mounting portions 50b. However, the end portions 12a, 13a, and 14a may be formed having tapered outer ends, as shown in FIG. 13, to facilitate the insertion thereof within the associated mounting portion 50b of the node 51. The end portions 12a, 13a, and 14a of the structural members 12, 13, and 14 can be secured to the associated mounting portions 50b by welds, such as shown at 53 in FIG. 13. The welds 53 may be created by any desired process, such as by laser welding or magnetic pulse welding. The use of conventional welding techniques to secure the structural members 12, 13, and 14 to the associated mounting portions 50b is facilitated when the structural members 12, 13, and 14 and the mounting portion 50b are all formed from the same metallic material.

FIGS. 14, 15, and 16 illustrate an end portion of one of the structural members 14 illustrated in FIG. 1 and a pair of insert cups, indicated generally at 60 and 61, that can be used to form a fifth embodiment of a node 62 (see FIGS. 17 and 18) for joining two or more of the structural members 11, 12, 13, and 14 illustrated in FIG. 1 together. The insert cup 60 includes a cup-shaped base portion 60a and an outwardly extending flange portion 60b. Similarly, the insert cup 61 includes a cup-shaped base portion 61a and an outwardly extending flange portion 61b. The insert cups 60 and 61 can be formed in any desired manner, such as by drawing or stamping a flat sheet of material into a desired configuration. Preferably, the cup-shaped base portion 60a of the first insert cup 60 is sized to fit snugly within the inner surface of the end portion 14a of the structural member 14, as shown in FIG. 16. Thus, the first insert cup 60 can be secured to the end portion 14a of the structural member 14, such as by a weld 63. Similarly, the cup-shaped base portion 61a of the second insert cup 60 is sized to fit snugly within the cup-shaped base portion 60a of the first insert cup 60, as also shown in FIG. 16. Thus, the second insert cup 61 can be secured to the first insert cup 60, such as by a weld 64. The welds 63 and 64 may be created by any desired process, such as by laser welding or magnetic pulse welding. The use of conventional welding techniques to secure the first and second insert cups 60 and 61 to the end portion 14a of the structural member 14 is facilitated when the insert cups 60 and 61 and the structural member 14 are all formed from the same metallic material.

To manufacture the node 62, the end of the structural member 14 and the insert cups 60 and 61 are positioned in a die (not shown), such as a conventional casting die, having a cavity formed therein. At the same time, the ends of the other structural members, such as the structural members 12 and 13 illustrated in FIG. 1 (which may have similar insert cups (not shown) secured to the end portions 12a and 13a thereof) are also positioned in the die in a desired relative orientation relative to one another. Then, the casting die is filled with a conventional casting material that extends about the ends of the structural members 12, 13, and 14 and the insert cups 60 and 61 respectively secured thereto, including about the outwardly extending flange portions 60b and 61b, as shown in FIGS. 17 and 18. It will be appreciated that the insert cups 60 and 61 prevent casting material from undesirably entering within the interiors of the respective structural members 12, 13, and 14. The casting material is subsequently hardened and removed from the casting die to provide the node 62 including a body portion 65 having the end portions 12a, 13a, and 14a secured thereto. The casting process is particularly well suited when the body portion 65 of the node 62 is formed from a different material than the structural members 12, 13, and 14 and the insert cups 60 and 61. For example, the body portion 65 of the node 62 may be formed from an aluminum alloy material, while the structural members 12, 13, and 14 and the insert cups 60 and 61 may be formed from a steel alloy material. By allowing the casting material to extend about the flange portions 60b and 61b of the insert cups 60 and 61, respectively, a secure mechanical connection is provided between the body portion 65 of the node 62 and the structural members 12, 13, and 14, especially when differing materials are used.

It should be appreciated that the insert cups 60 and 61 are intended to be representative of any desired structure or structures that may be secured to the end portions of the structural members to facilitate the securement thereof to the node 62. For example, the end portions of the structural members may have either or both of the inserts 40 and 50 discussed above secured thereto in lieu of the insert cups 60 and 61. Furthermore, the nodes may be cast in such a manner as to include other portions of the vehicle, such as a door latch structure, a spring seat structure, an energy absorbing structure, and the like.

FIG. 19 is an exploded perspective view of a plurality of structural members, such as a plurality of the straight members 11 illustrated in FIG. 1, prior to being joined together by a plurality of the nodes 62 illustrated in FIGS. 17 and 18 to form a vehicle frame sub-assembly 66. As shown therein, each of the structural members 11 has a pair of the insert cups 60 and 61 secured to the end portions thereof in the manner discussed above. The structural members 11 can be disposed within the respective cavities of a multiple cavity die (a four cavity die, in the illustrated embodiment) such that a pair of adjacent end portions of the structural members 11 extends within each of the die cavities (which are indicated by the dotted lines in FIG. 19). Then, the nodes 62 can be cast about the end portions thereof in the manner described above to form the vehicle sub-frame assembly illustrated in FIG. 20. FIGS. 21 and 22 show a similar structure and process, wherein a side frame structure for a vehicle, indicated generally at 70 in FIG. 22, is formed from a plurality of structural members 71 that are joined together by nodes 72 that are cast about the end portions thereof.

Figure 23:
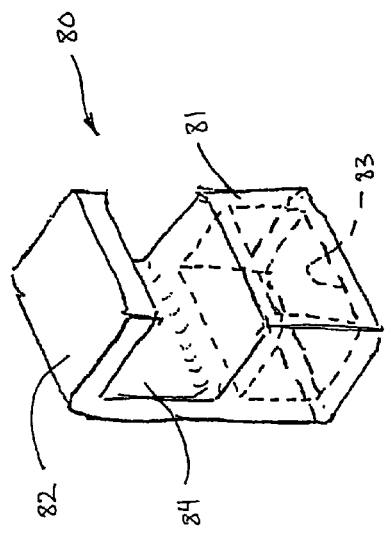
FIG. 23 is a perspective view of a sixth embodiment of a node that can be used to join a plurality of structural members together to form a vehicle frame assembly.

FIG. 23 is a perspective view of a sixth embodiment of a node, indicated generally at 80, that can be used to join a plurality of structural members together to form the vehicle frame assembly 10 illustrated in FIG. 1. The node 80 includes a hollow base portion 81 and an upstanding L-shaped portion 82. The hollow base portion 81 is closed on the back side thereof. As a result, a closed pocket 83 is defined within the base portion 81 of the node 80. Because the back side of the base portion 81 is closed, the pocket 83 can be accessed only through the bottom side of the node 80. The base portion 81 and the upstanding L-shaped portion 82 of the node 80 define a generally C-shaped recess 84 on the front side of the node 80.

Figure 24:
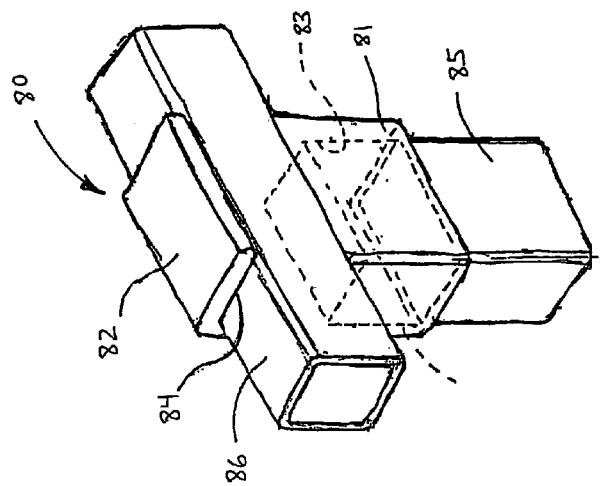
FIG. 24 is a perspective view of a pair of structural members that are connected together by the sixth embodiment of the node illustrated in FIG. 23.

FIG. 24 is a perspective view of a pair of structural members 85 and 86 that are connected together by the sixth embodiment of the node 80 illustrated in FIG. 23. As shown therein, an end portion of the first structural member 85 is inserted within the pocket 83 formed in the base portion 81 of the node 80. The node 80 and the end portion of the first structural member 85 can be secured together by any conventional means. For example, if the node 80 and the end portion of the first structural member 85 are formed from the same material, then they can be secured together by conventional welding techniques, such as described above. If, on the other hand, the node 80 and the end portion of the first structural member 85 are formed from different materials, then they can be secured together by adhesives, mechanical fasteners, and the like, as also described above. A portion of a second structural member 86 extends through the generally C-shaped recess 84 defined on the front side of the node 80. The node 80 and the portion of the second structural member 86 can also be secured together by any conventional means, as described above.

Figure 25:
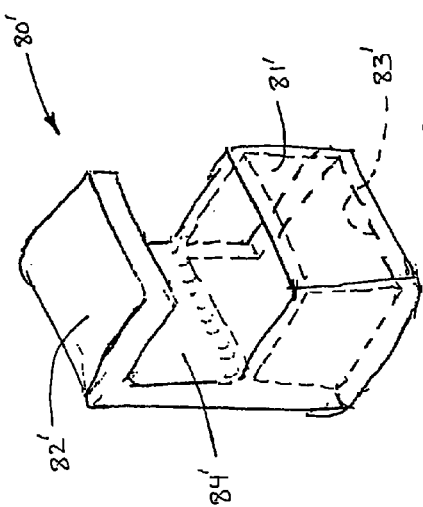
FIG. 25 is a perspective view of a seventh embodiment of a node that can be used to join a plurality of structural members together to form a vehicle frame assembly.

FIG. 25 is a perspective view of a seventh embodiment of a node, indicated generally at 80', that can be used to join a plurality of structural members together to form the vehicle frame assembly 10 illustrated in FIG. 1. The node 80' is similar to the node 80 and includes a hollow base portion 81' and an upstanding L-shaped portion 82'. In this embodiment, the hollow base portion 81' is opened on the back side thereof. As a result, an opened pocket 83' is defined within the base portion 81' of the node 80'. Because the back side of the base portion 81' is opened, the pocket 83' can be accessed from both the bottom and back sides of the node 80'. The base portion 81' and the upstanding L-shaped portion 82' of the node define a generally C-shaped recess 84' on the front side of the node 80'. The first and second structural members 85 and 86 can be secured to the node 80' in the same manner as described above.

Figure 26:
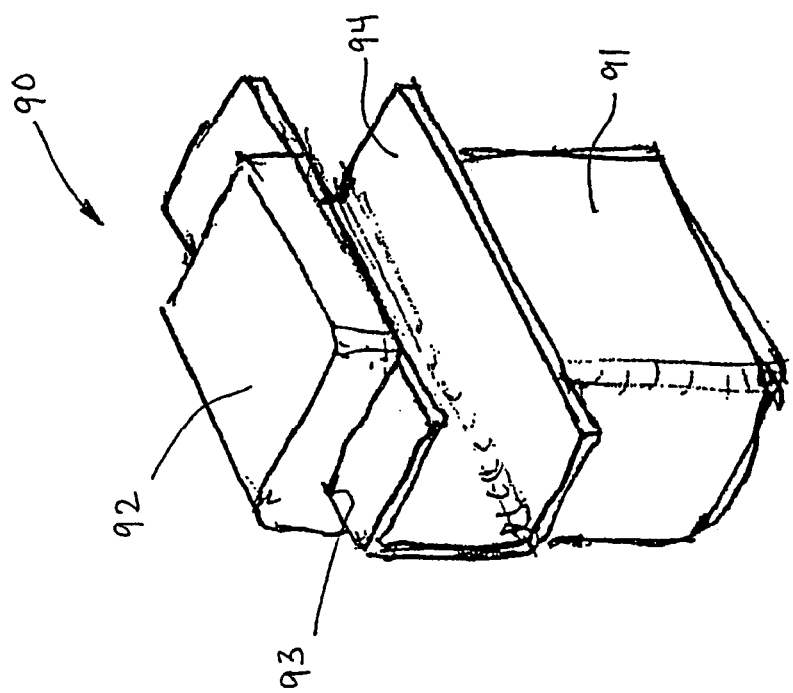
FIG. 26 is a perspective view of an eighth embodiment of a node that can be used to join a plurality of structural members together to form a vehicle frame assembly.

FIG. 26 is a perspective view of an eighth embodiment of a node, indicated generally at 90, that can be used to join a plurality of structural members together to form the vehicle frame assembly 10 illustrated in FIG. 1. The node 90 includes a hollow base portion 91 and an upstanding L-shaped portion 92. The hollow base portion 91 can be either closed or opened on the back side thereof, as discussed above. As a result, a pocket (not shown) is defined within the base portion 91 of the node 90. The base portion 91 and the upstanding L-shaped portion 92 of the node 90 define a generally C-shaped recess 93 on the front side of the node 90. A generally C-shaped mounting insert 94 is disposed within the generally C-shaped recess 93 on the front side of the node 90. The mounting insert 94 and the node 90 can be secured together by any conventional means. For example, if the mounting insert 94 and the node 90 are formed from the same material, then they can be secured together by conventional welding techniques, such as described above. If, on the other hand, mounting insert 94 and the node 90 are formed from different materials, then they can be secured together by adhesives, mechanical fasteners, and the like, as also described above.

Figure 27:
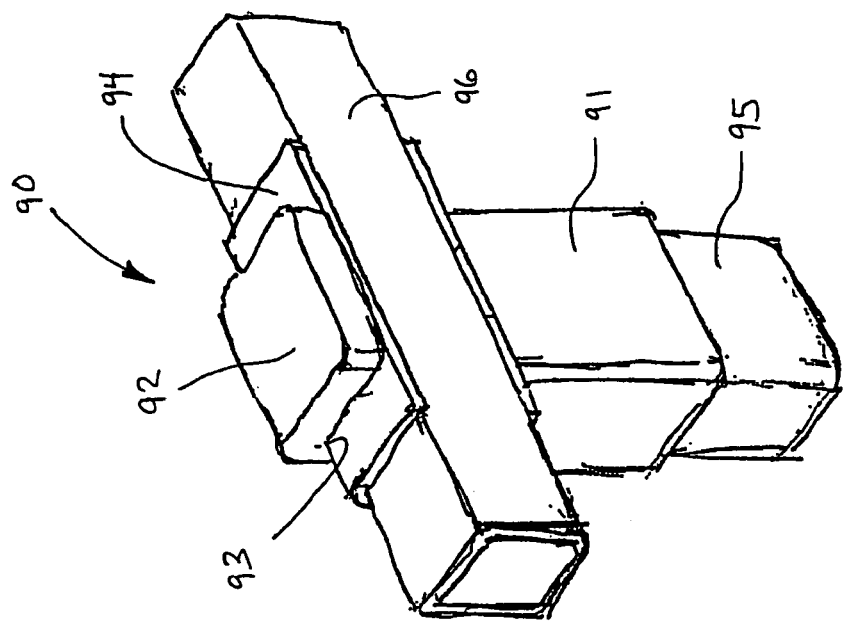
FIG. 27 is a perspective view of a pair of structural members that are connected together by the eighth embodiment of the node illustrated in FIG. 26.

FIG. 27 is a perspective view of a pair of structural members 95 and 96 that are connected together by the eighth embodiment of the node 90 illustrated in FIG. 26. As shown therein, an end portion of the first structural member 95 is inserted within the pocket formed in the base portion 91 of the node 90. The node 90 and the end portion of the first structural member 95 can be secured together by any conventional means. For example, if the node 90 and the end portion of the first structural member 95 are formed from the same material, then they can be secured together by conventional welding techniques, such as described above. If, on the other hand, the node 90 and the end portion of the first structural member 95 are formed from different materials, then they can be secured together by adhesives, mechanical fasteners, and the like, as also described above. A portion of a second structural member 96 extends through the generally C-shaped mounting insert 94 secured to the node 90. The C-shaped mounting insert 94 and the portion of the second structural member 96 can also be secured together by any conventional means, as described above.

FIG. 28 is a perspective view of a ninth embodiment of a node, indicated generally at 100, that can be used to form a portion of the vehicle frame assembly 10 illustrated in FIG. 1. In this embodiment, the node 100 includes a body portion 101 having a plurality of mounting inserts 102 secured thereto. The body portion 101 of the node 100 can be cast about the mounting inserts 102 as described above, particularly if the body portion 101 of the node 100 and the mounting insert 102 are formed from different materials. However, the mounting inserts 102 can be secured to the body portion 101 of the node 100 in any desired manner. A structural member 103 is adapted to be secured to one of the mounting inserts 102 in the same general manner as described above. The illustrated structural member 103 has an end portion 103a that is sized to cooperate with the associated mounting insert 102. For example, if the structural member 103 is hydroformed to a desired shape, then the end portion 103a may be the portion of the structural member 103 that was engaged by the end feed cylinders of the hydroforming machine during the hydroforming operation. The end portion 103a of the structural member 103 can be positioned on the associated mounting insert 102 and moved relative to the body portion 101 of the node both in a lateral direction, as indicated by the arrow 104, and in a rotational direction, as indicated by the arrow 105, until a desired relative orientation is achieved. Thereafter, the end portion 103a of the structural member 103 can be secured to the associated mounting insert 102 in the manner described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of manufacturing a vehicular frame assembly upon which a body portion and other components of the vehicle can be mounted comprising the steps of:
   (a) providing an insert having a node securing portion and a mounting portion;
   (b) casting a node about the node securing portion of the insert;
   (c) securing a first structural member to the mounting portion of the insert; and
   (d) securing a plurality of second structural members to the node and to the first structural member to form a vehicular frame assembly upon which a body portion and other components of the vehicle can be mounted.

2. The method defined in claim 1 wherein step (c) is performed prior to step (b).

3. The method defined in claim 2 wherein the first structural member is hollow and has an open end, and wherein the insert closes the open end of the first structural member.

4. The method defined in claim 1 wherein step (a) is performed by providing the insert from a first material, and wherein step (b) is performed by casting the node from a second material that is different from the first material.

5. The method defined in claim 1 wherein step (a) is performed by providing the insert with a node securing portion having an aperture formed therethrough, and wherein step (b) is performed by casting a portion of the node within the aperture.

6. The method defined in claim 1 wherein step (a) is performed by providing the insert with a node securing portion having a plurality of apertures formed therethrough, and wherein step (b) is performed by casting a portion of the node within each of the plurality of apertures.

7. The method defined in claim 1 wherein step (a) is performed by providing the insert with a node securing portion having a protrusion formed therein, and wherein step (b) is performed by casting a portion of the node about the protrusion.

8. The method defined in claim 1 wherein step (a) is performed by providing the insert with a node securing portion having a plurality of protrusions formed therein, and wherein step (b) is performed by casting a portion of the node about of the plurality of protrusions.

9. The method defined in claim 1 wherein step (c) is performed by initially moving the first structural member both in a lateral direction and in a rotational direction relative to the insert until a desired relative orientation is achieved, then securing the first structural member to the mounting portion of the insert.

10. The method defined in claim 1 wherein step (b) is performed prior to step (c).

11. A method of manufacturing a vehicular frame assembly upon which a body portion and other components of the vehicle can be mounted comprising the steps of:
   (a) providing a plurality of inserts, each insert having a node securing portion and a mounting portion;
   (b) casting a node about the node securing portions of each of the plurality of inserts;
   (c) securing a first structural member to the mounting portion of each of the plurality of inserts; and
   (d) securing a plurality of second structural members to the plurality of first structural members to form a vehicular frame assembly upon which a body portion and other components of the vehicle can be mounted.

12. The method defined in claim 11 wherein step (c) is performed prior to step (b).

13. The method defined in claim 12 wherein each of the first structural members is hollow and has an open end, and wherein the inserts each close the open ends of the first structural members.

14. The method defined in claim 11 wherein step (a) is performed by providing each of the inserts from a first material, and wherein step (b) is performed by casting the node from a second material that is different from the first material.

15. The method defined in claim 11 wherein step (a) is performed by providing each of the inserts with a node securing portion having an aperture formed therethrough, and wherein step (b) is performed by casting a portion of the node within each of the apertures.

16. The method defined in claim 11 wherein step (a) is performed by providing each of the inserts with a node securing portion having a plurality of apertures formed therethrough, and wherein step (b) is performed by casting a portion of the node within each of the plurality of apertures.

17. The method defined in claim 11 wherein step (a) is performed by providing each of the inserts with a node securing portion having a protrusion formed therein, and wherein step (b) is performed by casting a portion of the node about each of the protrusions.

18. The method defined in claim 11 wherein step (a) is performed by providing each of the inserts with a node securing portion having a plurality of protrusions formed therein, and wherein step (b) is performed by casting a portion of the node about of the plurality of protrusions.

19. The method defined in claim 11 wherein step (c) is performed by initially moving each of the first structural members both in a lateral direction and in a rotational direction relative to the inserts until a desired relative orientation is achieved, then securing the first structural members to the mounting portion of the inserts.

20. The method defined in claim 11 wherein step (b) is performed prior to step (c).

* * * * *